United States Patent [19]

Méry

[11] Patent Number: 4,784,243
[45] Date of Patent: Nov. 15, 1988

[54] SLIDING CALIPER DISC BRAKE

[75] Inventor: Jean-Claude Méry, Pavillons sous Bois, France

[73] Assignee: Societe Anonyme D.B.A., Drancy, France

[21] Appl. No.: 571,752

[22] Filed: Jan. 17, 1984

[30] Foreign Application Priority Data

Jan. 20, 1983 [FR] France ................................ 83 00846

[51] Int. Cl.⁴ .......................................... F16D 55/224
[52] U.S. Cl. ................................................ 188/73.45
[58] Field of Search ............... 188/73.45, 73.44, 73.43, 188/73.32, 73.47

[56] References Cited

U.S. PATENT DOCUMENTS

| | | | |
|---|---|---|---|
| 3,656,590 | 4/1972 | Newstead | 188/73.45 |
| 3,677,373 | 7/1972 | Lucien | 188/73.6 |
| 4,068,745 | 1/1978 | Haraikawa | 188/73.45 |
| 4,072,214 | 2/1978 | Haraikawa et al. | 188/72.4 |
| 4,085,828 | 4/1978 | Thioux | 188/71.6 |
| 4,341,289 | 7/1982 | Smith | 188/73.45 X |
| 4,373,616 | 2/1983 | Kondo | 188/73.45 |

FOREIGN PATENT DOCUMENTS

| | | | |
|---|---|---|---|
| 1390337 | 1/1965 | France. | |
| 1521762 | 3/1968 | France. | |
| 2226039 | 11/1974 | France. | |
| 2344751 | 10/1977 | France. | |
| 63562 | 5/1977 | Japan | 188/73.45 |
| 149629 | 9/1982 | Japan | 188/73.45 |
| 935995 | 9/1963 | United Kingdom. | |
| 1563213 | 3/1980 | United Kingdom. | |

Primary Examiner—George E. A. Halvosa
Attorney, Agent, or Firm—Larry J. Palguta; Ken C. Decker

[57] ABSTRACT

Disc brake having a caliper (18) mounted for sliding on a fixed support (10) by way of two axial pins (14, 16) passing through openings (20, 22) formed on arms (24, 26) of the fixed support (10). According to the invention, pins (14, 16) and arms (24, 26) are placed in a central opening (54) in the caliper (18). The pins (14, 16) are formed by bolts urging toward one another the portions (60 and 62) of the caliper (18) which are placed one on each side of the disc in order to increase the rigidity of the portions (56, 58) of the caliper passing above the disc.

2 Claims, 2 Drawing Sheets

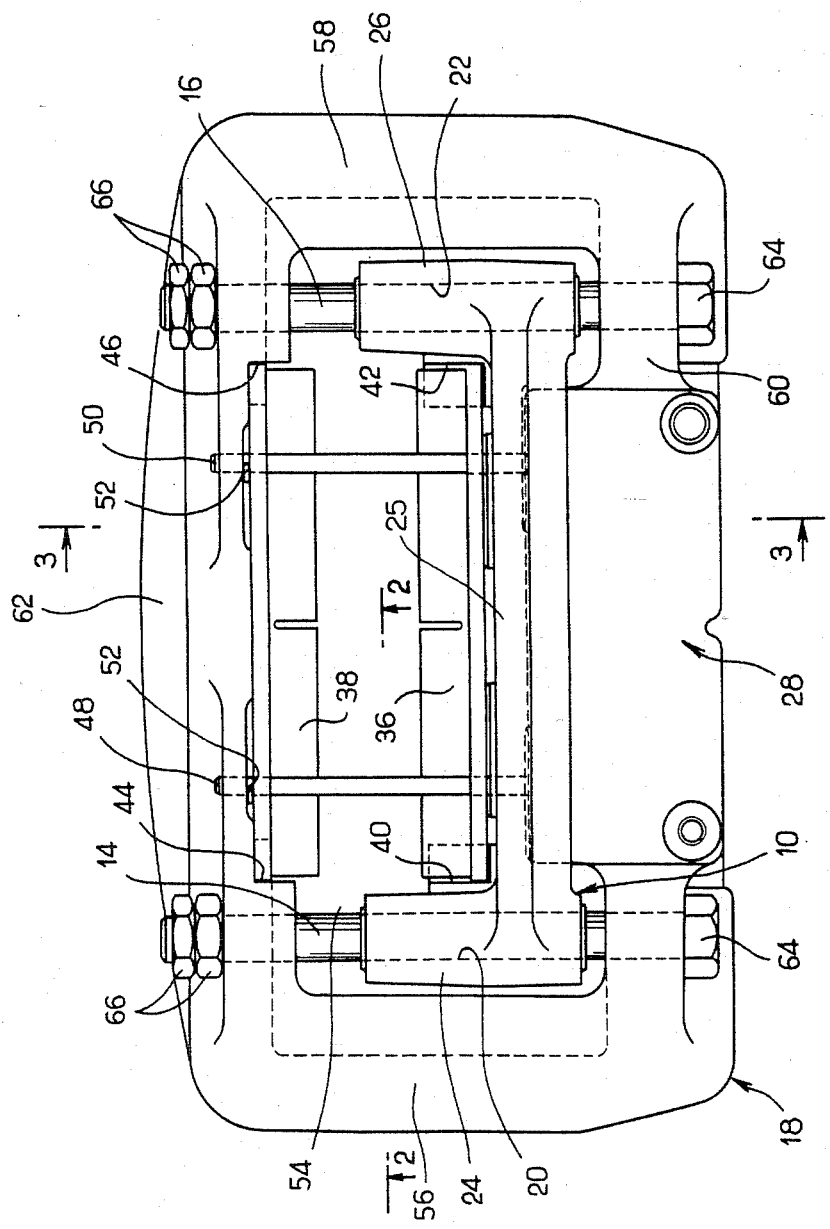
FIG_1

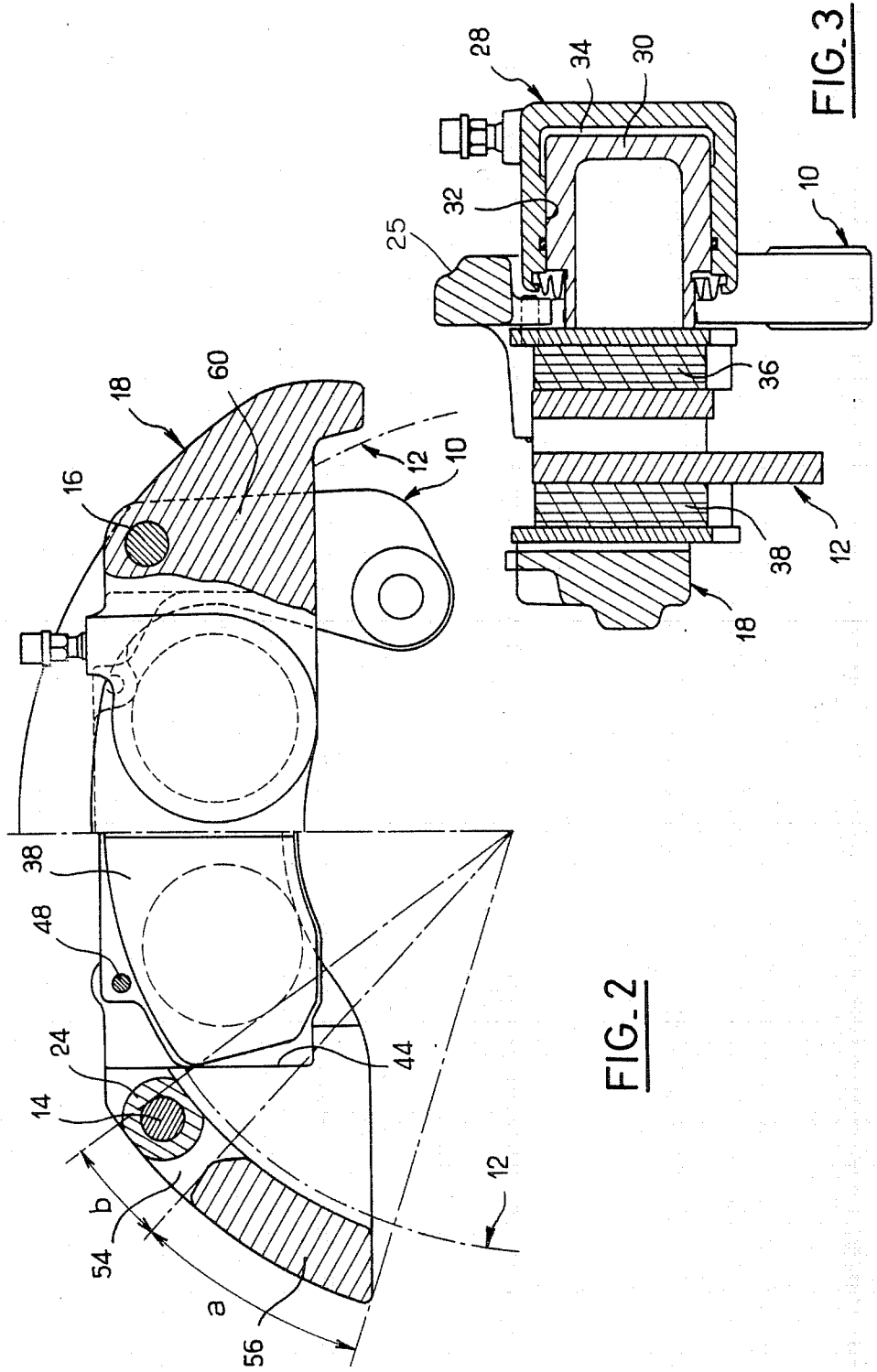

SLIDING CALIPER DISC BRAKE

The invention relates to a sliding caliper disc brake, particularly for motor vehicles.

The invention concerns more particularly a disc brake having a caliper mounted for sliding by means of two axial pins on a fixed support, operating means being associated with the caliper in order to urge directly a first friction element against a first face of the disc and, by reaction through the sliding caliper, to urge a second friction element against the other face of the disc, the pins being fastened to the caliper and passing through slide guide bores formed in the fixed support.

A brake of this kind has been described in French Patent No. 74-36 265 published under No. 2 289 799. This patent describes a disc brake having a sliding caliper of which a central portion passes above the disc in such a manner as to receive a friction element and, when required, to urge the latter into frictional engagement against the rotating disc when the caliper slides with the aid of pins which are fixed relative to the caliper, disposed one on each side of said central portion and passing through slide guide bores formed in a fixed support. This brake nevertheless has the disadvantage of requiring the removal of one pin and the rotation of the caliper around the other pin in order to permit the replacement of the friction elements. This operation, although simple, entails the risk of deterioration of the quality of the sliding of the caliper, for example through the soiling of the sliding contact zones, and also the risk of deterioration of the brake fluid supply pipe situated, for example, between the master cylinder of the vehicle and the brake motor associated with the caliper.

The invention seeks to provide a sliding caliper disc brake in which these disadvantages are avoided.

To this end, the invention proposes a disc brake having a slidably mounted caliper, of the type described above, in which the axial pins pass through a central opening in the caliper permitting the radial extraction of said friction elements, and in which said pins are prestressed in order to urge towards one another the two caliper portions placed one on each side of the disc, thus increasing the rigidity of the caliper portions passing above the disc on each side of said opening.

With this arrangement the friction elements can be extracted radially through the central opening of the caliper, the risk of deterioration of the sliding and of the brake fluid pipe is eliminated, and the reduction in the rigidity of the caliper because of the central opening is compensated by the use of slide pins which are prestressed in order to urge towards one another the two portions of the caliper situated one on each side of the disc, and this is done without increasing the radial dimension of the brake.

One embodiment of the invention will now be described as a non-limiting example and with reference to the accompanying drawings, in which:

FIG. 1 is a top view of a brake disc constructed in accordance with the invention, FIG. 2 is a front view in partial section on the line 2—2 in FIG. 1, with part broken away, and FIG. 3 is a view in section on the line 3—3 in FIG. 1.

The disc brake shown in FIGS. 1 to 3 comprises a fixed support 10 designed to be associated with a fixed part (not shown) of the vehicle and comprising, in the embodiment illustrated, a plate disposed near a disc 12 designed to rotate with a vehicle wheel (not shown).

The fixed support 10 receives a movable caliper 18, which is slidable with the aid of two circumferentially spaced axial pins 14 and 16 and which straddles the disc. The axes of the pins 14 and 16 are substantially parallel to the axis of rotation of the disc 12. As can be seen more particularly in FIG. 1, the pins 14 and 16 are fixed relative to the caliper 18 and pass in bores 20 and 22 formed respectively in the arms 24 and 26 of the fixed support 10. A tie-bar connection 25 extends between arms 24 and 26. The caliper 18 comprises, in a conventional manner, operating means consisting of a hydraulic brake motor 28, which in the embodiment shown comprises twin motors each having a piston 30 sliding in a bore 32 formed in the caliper 18 and being sensitive to the pressure prevailing in a control chamber 34 adapted to be connected to a pressure source, such as, for example, the master cylinder (not shown) of the vehicle. The pistons 30 are disposed in such a manner as to urge directly a first friction element or inner element 36 against a first face of the disc 12 when the pressurized fluid is admitted into the chamber 34. By reaction, the caliper 18 is able to move axially by sliding on the pins 14 and 16 in order to urge a second friction element or outer element 38 against the other face of the disc 12. As shown in FIG. 1, the inner friction element 36 is supported for sliding and anchored by circumferentially spaced axial edges 40 and 42 formed on the arms 24 and 26 of the fixed support 10. The outer friction element 38 is held and anchored on circumferentially spaced axial edges 44 and 46 formed on the caliper 18. Two pins 48 and 50 hold the inner and outer friction elements relative to the caliper 18 and to the fixed support 10, passing through holes situated opposite one another and formed in succession in the caliper 18, the friction elements 38, 36 and then the fixed support 10. Two securing pins 52 placed between the caliper 18 and the friction element 38 axially lock the pins 48 and 50. The tie-bar connection 25 is disposed axially between the operating means 28 and first friction element 36, and the tie-bar connection also extends partially over the operating means. According to the invention, and with reference to FIG. 1, it can be seen that the caliper 18 has a central opening 54 permitting the radial extraction of the friction elements 36 and 38, this opening 54 defining four zones of the caliper, that is to say the side portions 56 and 58 passing above the disc and connecting the portions 60 and 62 situated one on each side of the disc. In the embodiment illustrated the caliper portion 60 comprises the operating means or brake motor 28. According to the invention, the pins 14 and 16 pass through the central opening 54 and urge towards one another the caliper portions 60 and 62 by means of a nut and bolt system; in the embodiment shown the bolt has a head 64 bearing against the portion 60, while the other end of the bolt carries nuts 66 tightened against the portion 62; the smooth central portion of the bolt forms the slide pins 14 or 16. The arms 24 and 26 are aligned circumferentially with the respective side portions (see FIG. 2), with the diameter of the arms being substantially equal to the radial dimension of the side portions. Referring to FIG. 2, it can be seen that the pin 14 serves three functions. Firstly, its basic function consists in enabling the caliper to slide relative to the fixed support i.e., secondly, the prestressed arrangement of the nuts 66 limits the deflections of the portions 60 and 62 of the caliper when the brake is applied, and finally the pin 14 increases the rigidity of the caliper portion 56; in fact, in the calculation of the stresses and strains of the caliper, and more precisely of the portions 56 and 58 of the latter, if the pins 14 are not prestressed, only the angle a intervenes, whereas the prestressed arrangement of the pins permits the intervention of the angle a+b, which corresponds in fact to an enlargement of the caliper portions 56 and 58 without increasing the weight of the brake, on the one hand, and without increasing its radial dimension on the other hand, the arms 24 and 26 of the fixed support being accommodated, like the pins 14 and 16, in the central opening 54 of the caliper 18. As a result of the arms and slidably received pins disposed closely adjacent the respective side portions (see FIG. 2), the flexural inertia of the side portions is increased in accordance with the above described resulting enlargement of the side portions.

In an embodiment which is not illustrated, the brake motor 28 is formed by an attached portion 60 provided with two tapped lugs the axes of which coincide with the axes of the pins 14 and 16. The latter have a threaded portion in the zone located between the head 64 and the smooth portion used for the sliding of the caliper 18. On assembly, before the nuts 66 are placed in position, the brake motor is mounted on the caliper, the lugs of the motor 28 being placed between the caliper 18 and the arms 56 and 58. After the tightening of the motors with the aid of the tappings and the threaded portions, the nuts 66 are fitted and tightened for the prestressing of the pins. The pins then have a fourth function, namely the holding of the brake motor 28 on the caliper 18.

It is quite obvious that the invention is not limited to the embodiment illustrated; for example, it would be advantageously possible to replace the nuts 66 by tappings in the caliper portion 62, the prestressed arrangement of the pins 14 and 16 then being effected directly by turning the heads 64 to a predetermined torque value in order to achieve the desired prestressing.

I claim:

1. A disc brake having a caliper mounted for sliding by means of two axial pins on a fixed support, operating means being associated with the caliper in order to urge directly a first friction element against a first face of the disc and, by reacting through the caliper, to urge a second friction element against the other face of the disc, the pins being fastened to the caliper and passing slidably through slide guide bores formed in arms of the fixed support, characterized in that said caliper includes a single central through opening bounded by inboard and outboard caliper portions and side portions extending over the disc to join together the inboard and outboard caliper portions, the central through opening being substantially rectangular shaped and exposing the pins and arms disposed therein, the arm generally cylindrically-shaped and axially extending, the diameter of the arms being substantially equal to the radial dimension of said side portions and the arm aligned circumferentially therewith, the arms and slidably received pins disposed closely adjacent the respective side portions in order to increase the flexural inertia of said side portions, the axial pins passing through the central opening and permitting radial extraction of said friction elements, and the fixed support including a tie-bar connection extending between the arms and through said single central through opening to a position above said operating means, the tie-bar connection joining the arms to provide for distribution of braking forces and spaced an axial distance from the disc, the tie-bar connection disposed axially between the operating means and first friction element and extending partially over the operating means in order to permit radial securement and radial extraction of said friction elements, the pins being prestressed in order to urge toward one another the inboard and outboard caliper portions and increase the rigidity and resistance to deflection of the caliper portions and increase the flexural inertia of the side portions, said pins each being formed by a threaded bolt comprising a head acting against one of the caliper portions and a nut engaging the other caliper portion and tightened on a threaded part of the bolt in order to effect said prestressing.

2. The disc brake according to claim 1, characterized in that the operating means is secured to said caliper by means of said pins.

* * * * *